Dec. 4, 1928.  1,694,307
R. E. BOOTH
INDICATING DEVICES
Filed April 25, 1924
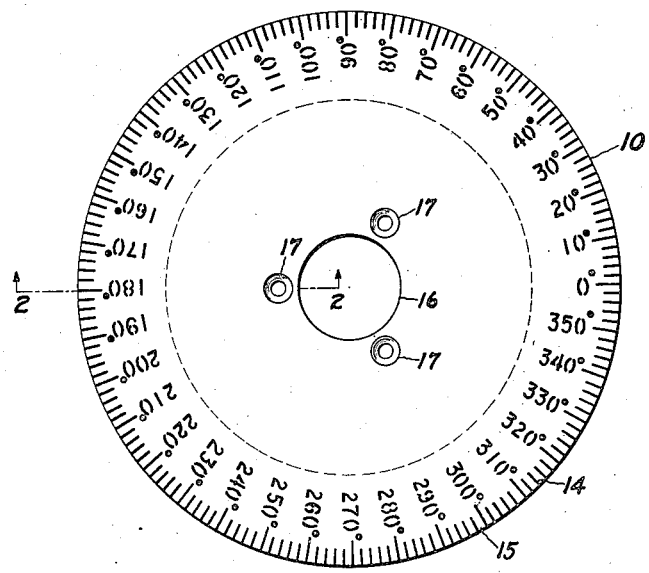
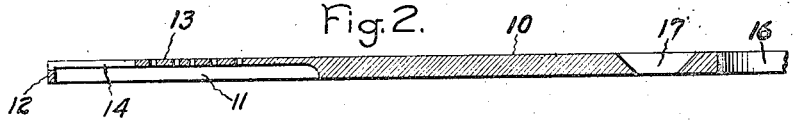
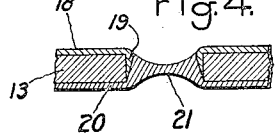
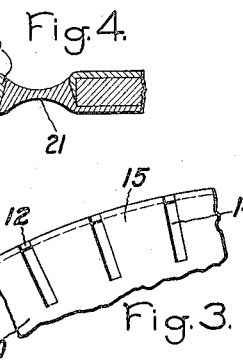
Inventor:
Ralph E. Booth,
by *Alexander S. Smith*
His Attorney.

Patented Dec. 4, 1928.

1,694,307

UNITED STATES PATENT OFFICE.

RALPH E. BOOTH, OF LYNN, MASSACHUSETTS, ASSIGNOR TO GENERAL ELECTRIC COMPANY, A CORPORATION OF NEW YORK.

INDICATING DEVICES.

Application filed April 25, 1924. Serial No. 709,057.

My invention relates to improvements in indicating devices and the like, and has for its object the provision of improved markings for indicating devices and a method of forming the markings.

My invention has particular application to indicating devices and the like which it is necessary or desirable to provide with artificial lighting, although it obviously has application to indicating devices in general regardless of the source of light. Where the source of light is on the same side of the indicating member as the eye of the observer, light is transmitted by reflection from the indicating member to the observer. This method is accompanied by an appreciable glare, particularly when an artificial source of light is used, with consequent eye strain and inaccuracies in the readings taken.

In accordance with my invention I arrange the indicating member so that light is diffused through it to the observer from a source of light on the side opposite the observer. In carrying out my invention I make the indicating member of opaque material and form markings thereon by cutting apertures in the member and closing these apertures with a translucent material.

For a more complete understanding of my invention reference should be had to the accompanying drawing in which Fig. 1 is a plan view of an indicating dial embodying my invention; Fig. 2 is an enlarged fragmentary section view taken along the line 2—2 of Fig. 1 looking in the direction of the arrows, showing various features of construction, while Figs. 3 and 4 are enlarged fragmentary plan and sectional views respectively showing details of construction.

Referring to the drawing, I have shown my invention in one form as applied to a rotating indicating dial 10. It will be understood, however, that my invention is applicable to various forms of indicating members whether movable or stationary. The dial 10 is formed from a blank disc of a suitable opaque material which may be a metal. I have found that aluminum, due to its lightness and rigidity, is a very suitable material for making indicating dials in accordance with my invention.

The dial 10 is shown as graduated in degrees although obviously any other suitable markings may be provided. In forming the graduations or markings the metal of the blank dial is cut away on the lower side so as to form a shallow annular groove or depression 11 and leave a flange 12 around the periphery to strengthen the dial and prevent warping. The various desired markings are now formed by cutting or stamping apertures in the thin annular portion 13 formed by the cutting away of the metal on the under side. The graduations 14 are cut through the thin portion 13 as slots, the rim 12 serving to hold the ends of the narrow projecting strips 15, formed by the cutting of the slots, in the proper spaced relation and prevent them from warping while the slots are being cut and afterward. The numerals are also cut or stamped through the metal. It will thus be observed that the numerals and graduations are formed in the dial as in a stencil. To provide for mounting the dial a central aperture 16 may be provided with spaced screw holes 17.

After the stencil supporting member has been formed as described, an ornamental or protective coating of enamel 18 (Fig. 4) may be applied to the upper or outer surface. This coating, however, is not indispensable. Preferably a black enamel is used. A linseed oil enamel, such as that commercially known as hilo enamel, adheres firmly to the aluminum and otherwise forms a very satisfactory coating for the upper surface of the dial. This coating 18 may be conveniently applied by spraying it on from a distance. As shown in the drawing, the enamel 18 flows into the apertures to some extent, covering the side walls of the apertures with a coating 19.

When the enamel 18 has dried and hardened satisfactorily, a suitable material is applied to close the apertures with a translucent solid. A white cellulose lacquer enamel, such as that commercially known as zapon enamel is a very satisfactory material for this purpose. This enamel is applied to the lower or inner surface of the dial in the wide shallow groove 11, as indicated by reference numeral 20, a sufficient quantity being applied to close the apertures forming the graduations and numerals. It may be flowed on with a brush. To obtain the desired consistency, the commercial "zapon" enamel is preferably thinned with acetone. The coating of enamel 20 applied to the lower surface of the dial and closing the apertures with a thin white translucent film 21 unites with the coating of enamel 19 on the sides of the apertures, thus forming a continuous coating.

The zapon enamel forms a tough translucent film closing the apertures and adhering firmly to the aluminum. It has no appreciable tendency to crack due to expansion and contraction of the metal of the dial and does not peel off. The hilo enamel also adheres firmly to the aluminum and does not crack or peel. It gives the upper surface of the dial the appearance of dull finish hard rubber, which is in sharp contrast with the white translucent films closing the apertures.

In using the dial, the light, whether natural or artificial, is directed on the lower surface of the dial and diffuses through the translucent films of enamel closing the apertures. Although the translucent films may and preferably do represent the markings, this may obviously be reversed so that the opaque portions represent the markings. In any event the opaque portions and the translucent portion through which the light is diffused stand out in great contrast so that readings may be taken with accuracy and dispatch and, as previously pointed out, without the usually attendant eye strain.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. An indicating member comprising a support provided with apertures designating the desired markings thereon, a coating of opaque enamel on one surface of said support, and a coating of translucent enamel on the other surface of said support closing said apertures.

2. An indicating member comprising a support provided with apertures designating the desired markings thereon, a coating of opaque enamel on the upper surface of said support, and a coating of translucent enamel on the lower surface of said support closing said apertures and uniting with the enamel on the upper surface of said support to form a continuous coating.

3. An indicating member comprising a metallic dial provided with a circumferential groove forming a relatively thin portion bounded by a peripheral strengthening flange, said thin portion being provided with apertures corresponding to the desired markings, and a coating of translucent enamel on said dial so applied as to form translucent films closing said apertures.

In witness whereof, I have hereunto set my hand this 23rd day of April, 1924.

RALPH E. BOOTH.